INVENTORS.
DONALD H. BRITTON,
WILMER A. HOYER,
BY John S. Schneider
ATTORNEY.

May 17, 1966　　D. H. BRITTON ET AL　　3,251,998
APPARATUS FOR GATING THE PHOTO-MULTIPLIER OF
A SCINTILLATION DETECTOR
Filed Nov. 29, 1962　　　　　　　　　　　　　2 Sheets-Sheet 2

$E_{z_{50}} < E_{z_{51}} < E_{z_{52}}$

SILICON ZENER DIODE
CHARACTERISTICS

INVENTORS.
DONALD H. BRITTON,
WILMER A. HOYER,
BY
ATTORNEY.

United States Patent Office 3,251,998
Patented May 17, 1966

3,251,998
APPARATUS FOR GATING THE PHOTO-MULTI-
PLIER OF A SCINTILLATION DETECTOR
Donald H. Britton and Wilmer A. Hoyer, Houston, Tex.,
assignors, by mesne assignments, to Esso Production
Research Company, Houston, Tex., a corporation of
Delaware
Filed Nov. 29, 1962, Ser. No. 240,908
5 Claims. (Cl. 250—207)

The present invention generally concerns improved radioactivity detection, especially detection of radiation in wells. More particularly, it relates to gating the output signals of a scintillation detector.

In one preferred method of borehole logging to investigate the contents and nature of subsurface formations, either natural or artificially induced radioactivity is detected in a scintillation counter detection system in which a phosphor or scintillating material, such as crystals of anthracene or sodium iodine used to translate incoming radiation such as gamma rays and neutrons into light rays, is positioned adjacent a photomultiplier. Some of the light rays emitted by the phosphor impinge on the photocathode of the photomultiplier and are converted into electrical pulses. A series of dynodes or anodes in the photomultiplier amplify the pulses in stages to obtain strong output electrical pulses from the photomultiplier. Ordinarily the output electrical pulses are amplified, analyzed by transmission through a discriminator (which only passes pulses of selected amplitude) or an integrator (which averages out the pulses with respect to amplitude and frequency) or both and displayed or otherwise recorded. In certain borehole investigating procedures it is necessary to observe the scintillation signals which occur only during a very short period of time. Signals arriving outside of this observation or gate period are ignored. For example, in one particular technique a source of radiation and a detector of radiation induced thereby are pulsed and gated, respectively, in order to differentiate between induced radiation resulting from reactions substantially early in the life of bombarding primary radiation from reactions later in the life of the bombarding primary radiation. For this pulsing system to operate most effectively, it is necessary to operate the detector for extremely short periods of time, whether the detector is to be used in coincidence with the "on" periods of the source or is to be used out of coincidence therewith, and to so operate it, the detector must be switched on and off at a point in the detector system where the pulses to be detected and counted are still of short time duration compared to the "on" time of the detector.

An ideal detector for investigating in this manner would be one whose output is an exact reproduction of the scintillation pulses during a selected time interval and is zero otherwise. However, for most applications, a reduction of the amplitude of the undesired signals occurring during the "off" period to less than 10% of the desired signals occurring during the "on" period is satisfactory. U.S. Patents No. 2,951,941 entitled, "Method and Apparatus for Pulsing a Scintillation Detector," filed January 7, 1957, by H. R. Brannon, Jr., and No. 2,911,535 entitled, "Method and Apparatus for Pulsing a Scintillation Detector," filed January 8, 1957, by N. L. Muench, describe and claim techniques for turning the photomultiplier tube "on" for the desired interval in which signals produced during the "off" period are reduced to 5% to 10% of those produced during the "on" period.

The present invention is related to the apparatus and techniques described in the two patents mentioned supra; however, it differs in that in the present invention the scintillation pulses are gated external to the photomultiplier tube instead of gating the photomultiplier tube itself.

A primary object of the present invention is to provide improved method and apparatus for gating a photomultiplier. A further object of the invention is to provide gating circuits for gating photomultiplier tube signals without disturbing the operating voltages of the photomultiplier. Another object of the invention is to provide gating devices for gating photomultiplier tube signals that are easily neutralized to obtain all of the photomultiplier signals. This latter feature is particularly useful in determining the proper operation of both the photomultiplier and gating circuits.

The techniques and apparatus of the invention involve the use of electrical switches in the signal circuit which transmit output signals of a photomultiplier only during a selected time interval together with symmetrical balancing networks for balancing switching transients. In one embodiment of the invention, a normally open switch is placed in series with the signal line and is closed during the desired transmission interval. In another embodiment of the invention, a switch is placed between the signal line and electrical ground; this switch is normally closed and is opened during the desired transmission interval. A third embodiment of the invention involves a combination of series and parallel switches in a single circuit. In practice, all of these switches are replaced by diodes (thermionic or semiconductor), vacuum tubes, and transistors.

As will be more evident from the detailed description of the invention which follows, the techniques of the invention achieve the following advantages:

The photomultiplier tube may be operated in a conventional manner; i.e., a simple series resistor string may be used to provide the proper voltages to the tube elements. In the operation of the photomultiplier tube detectors described in the patents noted supra, the optimum voltage between stages must be altered in order to reduce the signals during the "off" period, and these gating pulses do not necessarily restore the optimum voltage between stages during the "on" period, and instability in the gain of the photomultiplier tube may result.

Trouble shooting and routine checking are simplified. Performance of the detector can easily be checked, since the scintillation pulses before and after the gating apparatus are readily available. On the other hand, when the photomultiplier tube itself is gated, only the "on" signal is available; if a check under non-gated conditions (i.e., turned "on" all of the time) is desired, another socket for the photomultiplier must be installed, which involves considerable expenditure of time since when used in a logging sonde, the tube and scintillation crystal are packaged in a thermally insulated container. When all of the scintillation pulses are available, the length of time to accumulate sufficient data to determined resolution can be reduced to appreciably less time than when only the gated pulses are available.

Electrical leads from the instrument into the thermally insulated container for the photomultiplier and crystal are simplified since the conventionally wired socket requires only three wires, positive high voltage, negative high voltage, and output signal. Gating the photomultiplier itself requires additional wire for the gate signals and the coupling capacitors. Elimination of these additional lead wires increases reliability and ease of assembly, which are important factors in a field instrument.

The above purposes and advantages of the invention will be apparent from a more detailed description thereof when taken with the drawings wherein.

Figure 1:
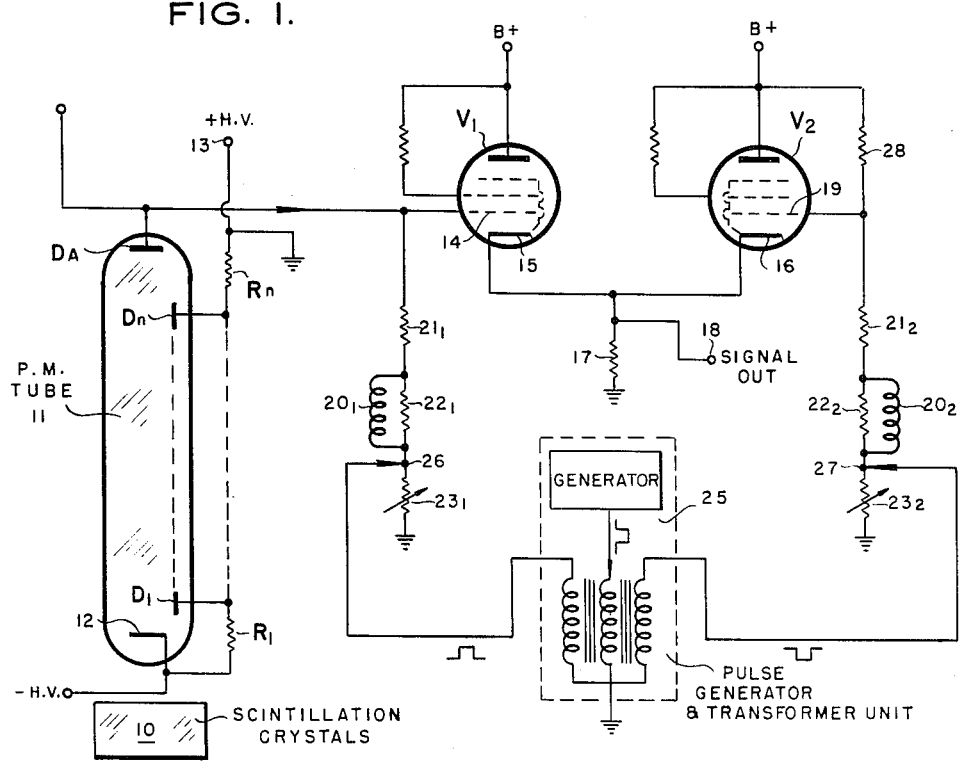
FIG. 1 is a circuit diagram of one embodiment of the invention.

Reference is now made to FIG. 1 for a detailed description of the embodiment of the invention shown in this figure. Scintillation material 10 positioned adjacent a photomultiplier tube 11 translates incoming radiation into light rays some of which impinge upon the photocathode 12 of the photomultiplier and are converted into electrical pulses. A series of dynodes or anodes $D_1$ to $Dn$ arranged in the photomultiplier amplify the pulses in stages to obtain strong output electrical signals from the anode DA. Each dynode is maintained at a higher potential than the preceding one (and the photocathode) by means of a voltage divider circuit which includes a positive high voltage source 13 placed at ground potential and a plurality of resistors $R_1$ to $Rn$.

The output anode DA is directly coupled to the control grid 14 of a vacuum tube $V_1$, the cathode 15 of which is connected to the cathode 16 of a second vacuum tube $V_2$, and both cathodes are connected to a common cathode resistor 17. The desired gated output signals appear at point 18.

Vacuum tubes $V_1$ and $V_2$ are high frequency voltage amplifier types with low interelectrode capacitance such as the 6AK5.

The impedances of control grid 14 of tube $V_1$ and the control grid 19 of tube $V_2$ are made equal by making the corresponding inductances $20_1$, $20_2$; resistors $21_1$, $21_2$ and $22_1$, $22_2$; and potentiometers $23_1$, $23_2$ of their grid circuits have equal values.

A pulse generater unit 25 which includes a transformer as shown produces pulse widths equal to the gating interval and supplies a positive gate pulse to the grid circuit of tube $V_1$ at point 26 and an equal and opposite gate pulse to the grid circuit of tube $V_2$ at point 27.

The value of a resistor 28 in the grid circuit of tube $V_2$ is selected such that sufficient current is maintained through tube $V_2$ to cut off tube $V_1$ because of the voltage drop across the common cathode resistor 17.

Placing the positive high voltage 13 of the photomultiplier circuit at ground potential permits a direct connection of the scintillation pulses into tube $V_1$. The time constant of the input circuit of tube $V_1$ is kept very short so that the very sharp pulses which are characteristic of the scintillation signals from the photomultiplier may be preserved.

When the negative gate pulse sufficient to cut off tube $V_2$ is applied to tube $V_2$ from pulse generator 25, tube $V_1$ operates as an amplifier, and the scintillation pulses from anode DA appear across cathode resistor 17 at point 18. The negative pedestal upon which these desired signals are superimposed caused by the action of tube $V_2$ is balanced out by the positive gate pulse applied to tube $V_1$ from pulse generator 25. Adjusting potentiometers $23_1$ and $23_2$ balance the gate pulses so that the quiescent voltage level will be free of a pedestal.

As soon as the negative gate pulse is completed, tube $V_2$ returns to conduction and the tube $V_1$ is again cut off. Scintillation signals from anode DA occurring outside the gating interval appear across cathode resistor 17 greatly reduced because tube $V_1$ is not conducting. The signals appearing at the output point 18 are short compared to the gate interval which is essential to proper resolution.

Inductance $20_1$ and resistor $22_1$ provide peaking for these scintillation pulses; however, this also introduces some distortion into the positive gating waveform supplied to point 26. By duplicating the network in the grid circuit of tube $V_2$ out of phase distortion is produced which results in complete pedestal cancellation.

The photomultiplier signals may be observed without gating by removing tube $V_2$ from its socket or otherwise disabling it and disconnecting pulse generator 25 from the grid circuit of tube $V_1$ to allow all of the photomultiplier signals to appear across resistor 17.

Although not shown, a transistorized version of the FIG. 1 circuit could be made in which the major change would involve replacing the two vacuum tubes with two high frequency transistors.

Figure 2:
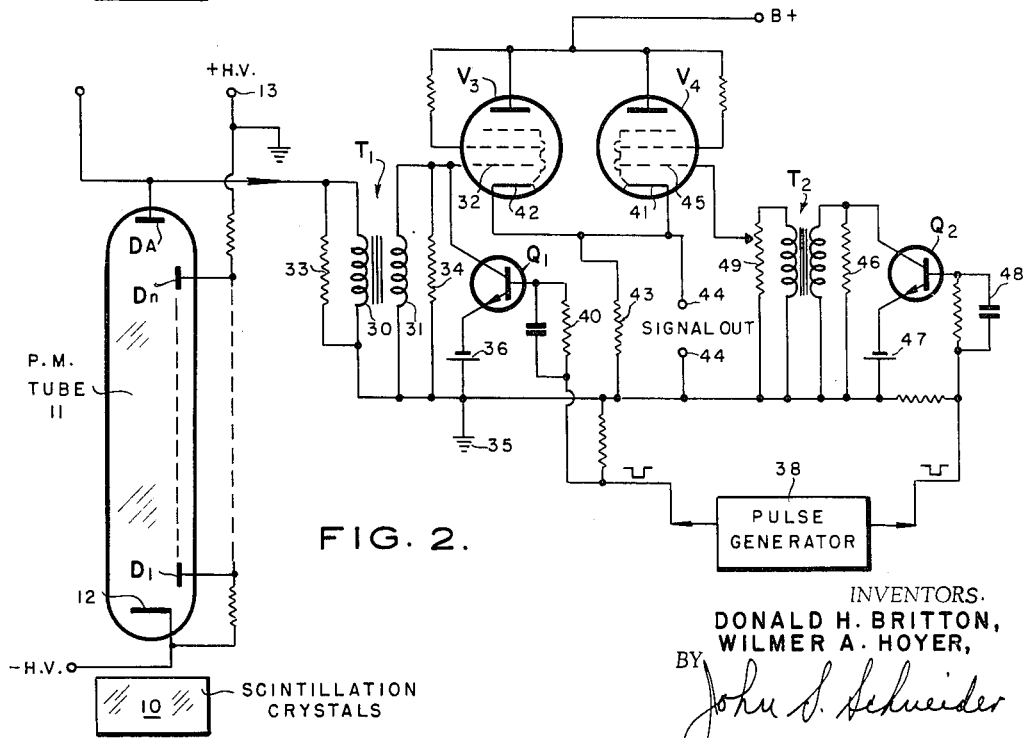
FIG. 2 is a circuit diagram of another embodiment of the invention.

Reference is now made to FIG. 2 which illustrates the shunt switch principle embodiment of the invention.

The photomultiplier tube 11 and scintillation material 10 arrangement is the same as that described with respect to FIG. 1.

The output dynode DA is directly coupled to the primary winding 30 of a transformer $T_1$ which is a low inductance pulse transformer used to invert the photomultiplier signals and provide a suitable load impedance for the photomultiplier anode DA. A very sharp, positive pulse results on the secondary winding 31 of transformer $T_1$, one terminal of which is connected to the control grid 32 of a vacuum tube $V_3$ as shown. Damping resistances 33 and 34 connected across the primary and secondary windings 30 and 31, respectively, prevent ringing in the transformer windings.

A transistor $Q_1$ is connected across the secondary winding 31 and operates as the switch. The collector of transistor $Q_1$ is connected to the control grid of tube $V_3$ and the emitter of transistor $Q_1$ is connected to the other terminal of secondary winding 31 grounded at 35 through a battery 36. A pulse generator 38 applies a gating pulse to the base of transistor $Q_1$ through a speedup resistor capacitor network 40.

The cathode 41 of a second vacuum tube $V_4$ is coupled to the cathode 42 of tube $V_3$ and to a common cathode resistor 43. The desired output signals appear across resistor 43 at terminals 44. The control grid 45 of tube $V_4$ is connected to pulse generator 38 through a balancing circuit which includes a transformer $T_2$, a transistor $Q_2$, a resistor 46, a battery 47, a speedup resistor capacitor network 48, and a potentiometer 49.

Transistors $Q_1$ and $Q_2$ are switching transistors having switching times of less than $0.5\mu$ seconds. By switching time is meant the length of time the transistor takes in changing from the saturated state to the nonconducting state or vice versa. A silicon mesa transistor of the type 2N702 which has a switching time of about $0.1\mu$ seconds is suitable for this application. Batteries 36 and 47 provide base-to-emitter bias of sufficient amplitude to operate the transistors in the saturation region during the quiescent period.

Transistor $Q_1$ shunts the secondary winding 31 with a resistance equal to its low saturation resistance (approximately 1% of the value of resistor 34). This prevents the scintillation signals from appearing on the control grid 32 of tube $V_3$.

When the gating signal from pulse generator 38 is applied to the base of transistor $Q_1$, a rapid transition from the conducting to the non-conducting state occurs in transistor $Q_1$ which removes the low impedance shunt across the secondary winding 31. The photomultiplier signals are now allowed to be developed at the control grid 32 of tube $V_3$. As soon as the gating signal is removed from the base of transistor $Q_1$, the transistor returns to the conducting state and shunts the incoming photomultiplier signals. Thus, transistor $Q_1$ operates as a normally closed switch across the secondary of transformer $T_1$, and application of the gating signal momentarily opens the switch to allow the desired photomultiplier signals through and closes again after the gating interval. The "on" to "off" ratio of the desired signals at the control grid of tube $V_3$ can be as high as 30 to 1.

Superimposed on the desired photomultiplier signals are switching transient spikes generated by transistor $Q_1$ at the beginning and end of each gating interval. Balancing networks of tube $V_4$, transformer $T_2$, transistor $Q_2$, etc., generate an equal and opposite switching transient to exactly balance those appearing at the grid of tube $V_3$. Transistor $Q_2$ is chosen to have the same switching transients as those of transistor $Q_1$ and the loading network of transistor $Q_2$ is chosen to closely duplicate the loading network of transistor $Q_1$ so that the signal produced on the secondary of transformer $T_2$ will be exactly opposite to the switching transients generated by transistor $Q_1$. Potentiometer 49 adjusts the amplitude of the balancing signal for exact cancellation.

When it is desired to observe the photomultiplier signals without gating, a small DC voltage may be applied to the base of transistor $Q_1$.

Figure 3:
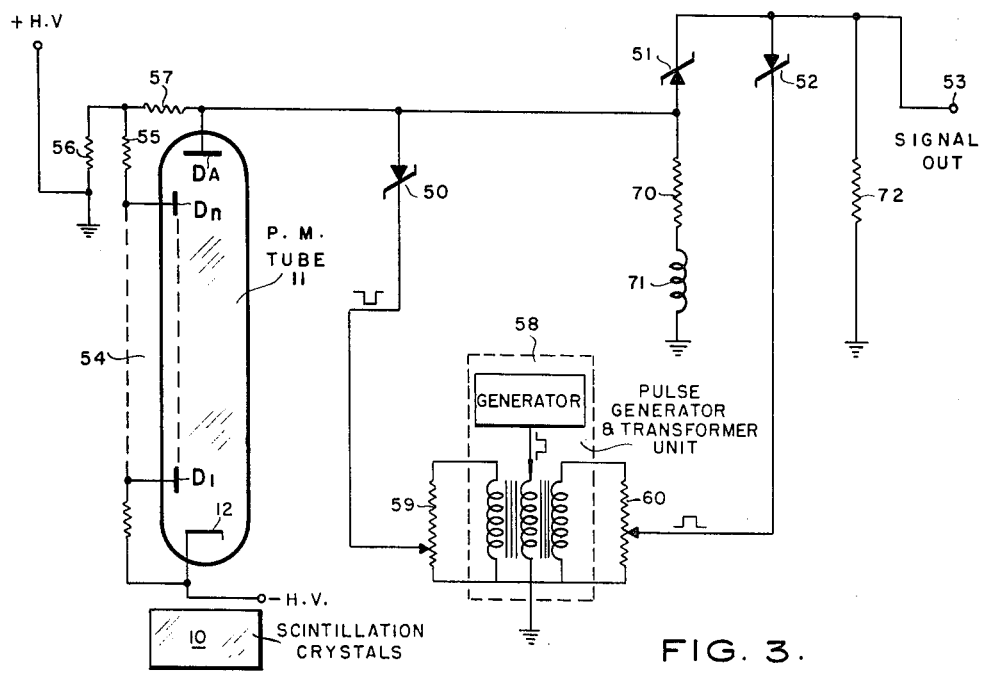
FIG. 3 is a circuit diagram of still another embodiment of the invention.
Figure 4:
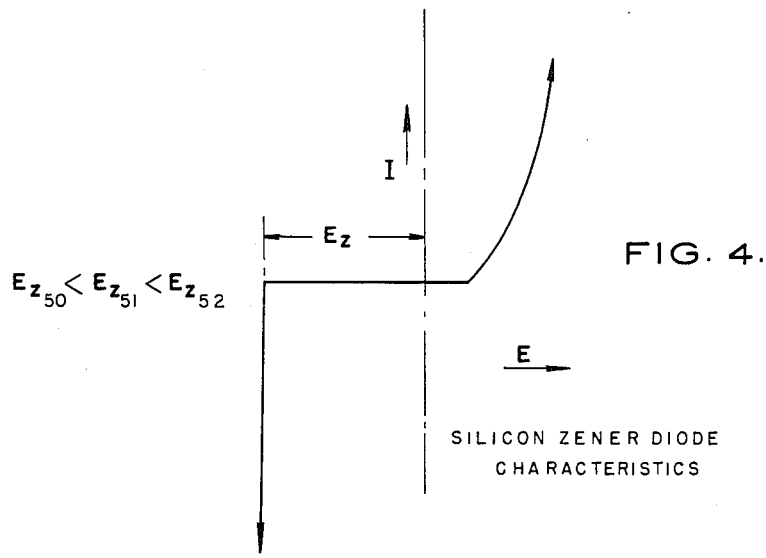
FIG. 4 is a plot of current versus voltage to illustrate the desired characteristics of the silicon zener diodes of FIG. 3.

Reference is now made to FIGS. 3 and 4 for a detailed description of the embodiment of the invention illustrated by these figures. The circuit shown in FIG. 3 combines the series switch and shunt switch techniques of linear gating.

A diode 50 connected to anode DA acts as a normally closed shunt switch. Another diode 51 also connected to anode DA functions as a normally open series switch, and a third diode 52 connected to diode 51 does not operate as a switch but instead functions to obtain a balancing signal to cancel voltage spikes which appear at the output terminals 53 of the circuit produced by the stray capacity of diodes 50 and 51.

Anode DA of photomultiplier tube 11 is connected to the dynode voltage divider network 54 which holds anode DA at a negative potential as determined by resistors 55 and 56. This potential is selected to exceed the zener breakdown voltage of diode 50, but not to exceed the zener voltage of diode 51. A resistor 57 in the photomultiplier network serves as a zener current limiter and isolation resistance between the dynode voltage divider network 54 and the linear gate circuit.

Scintillation signals appearing at the photomultiplier anode $Dn$ will be highly attenuated by the low resistance path to ground through diode 50 and potentiometer 59.

A pulse generator unit 58 which includes a transformer as shown applies a negative gate pulse to the cathode of diode 50 through a potentiometer 59 and a positive balance pulse to the cathode of diode 52 through a potentiometer 60. Potentiometers 59 and 60 are low resistance value potentiometers employed to adjust the amplitudes of the gate and balance pulses, respectively.

The negative gate pulse delivered to the cathode of diode 50 is sufficient to drive it into the nonconducting region. This negative gate pulse appears at the anode of diode 51 and is of sufficient amplitude to bring diode 51 up to, but not into, the avalanche region of reverse breakdown. Photomultiplier signals are now developed across a resistor 70 and peaking coil 71. These signals are negative going and will break down diode 51 and appear across output resistor 72 at the output terminals 53. Since the negative gate pulse does not exceed this breakdown voltage, no pedestal appears at output 53.

Stray capacity effects of diodes 50 and 51 cause sharp transient spikes to appear which are balanced by means of the positive pulse and diode 52. The zener breakdown voltage of diode 51 must be stable to insure linearity and no pedestal feed through. Therefore, a diode having the lowest temperature coefficient for zener voltage is selected for diode 51. Diode 50 then is selected with a sufficiently lower zener breakdown voltage to permit a reasonable variation in this characteristic in diode 50. The zener diode characteristics required are illustrated graphically in FIG. 4.

When it is desired to observe the photomultiplier signals without gating, a negative potential of several volts may be connected to the cathode end of diode 50 with the potentiometer connection removed to bias diode 50 into the non-conducting region and diode 51 into the conducting region so that all photomultiplier signals appear across output resistor 72.

The pulse generators used in these circuits may be any desired types. For a discussion of pulse generators, see G. N. Glasoe and J. V. Lebaeqy, Pulse Generators, MIT Radiation Lab. Series, vol. 5, McGraw-Hill Book Co., Inc., New York, 1948.

Having fully described the nature, operation and objects of the invention, we claim:

1. Apparatus for gating the output signals of a photomultiplier comprising:
   first and second amplifier-type vacuum tube circuits connected to a common cathode resistor;
   means electrically connecting said first vacuum tube circuit to said photomultiplier for applying said output signals to the control grid of said first vacuum tube;
   means connected to said first vacuum tube circuit for applying a positive pulse to the control grid of said first vacuum tube;
   means connected in said second vacuum tube circuit for maintaining sufficient current through said second vacuum tube to cut off conduction through said first vacuum tube because of the voltage drop across said common cathode resistor;
   means for applying a gating pulse equal and opposite to said positive pulse to said second vacuum tube to permit said first vacuum tube to amplify and conduct said output signals; and
   means for balancing switching transients.

2. Apparatus for gating the output signals of a photomultiplier comprising:
   first and second amplifier-type vacuum tube networks;
   pulse generator means connected to said first and second vacuum tube networks adapted to apply a positive pulse to the control grid of said first vacuum tube and an equal negative gate pulse to the control grid of said second vacuum tube;
   said control grid networks of said vacuum tubes including paired inductances, resistors, and potentiometers of equal value so that the control grid impedances of each vacuum tube are equal;
   the control grid of said first vacuum tube being connected to the output of said photomultiplier;
   a common cathode resistor connected to the cathodes of each vacuum tube; and
   means in said second vacuum tube network for maintaining sufficient current through said second vacuum tube to cut off conduction through said first vacuum tube because of the voltage drop across said common cathode resistor;
   said first vacuum tube amplifying and conducting said photomultiplier output signals when said gating pulse is applied to said second vacuum tube network.

3. Apparatus for gating the output signals of a photomultiplier comprising:
   first and second amplifier-type vacuum tubes;
   a common cathode resistor connected to the cathodes of said vacuum tubes;
   a transformer connected to the output of said photomultiplier adapted to invert said photomultiplier signals and provide a suitable load impedance for the photomultiplier anode;
   a silicon transistor switching means coupled across the secondary of said transformer adapted to shunt said secondary with a resistance equal to its saturation resistance;
   said secondary being also connected to the control grid of said first vacuum tube; and
   a balancing circuit connected to the control grid of said second vacuum tube;
   pulse generator means adapted to apply a gating pulse to the base of said transistor to remove the low impedance shunt across the secondary to permit said output signals to be developed at the control grid of said first vacuum tube and to apply an equal pulse to the control grid of said second vacuum tube through said balancing circuit.

4. Apparatus as recited in claim 3 wherein a battery is connected to the emitter of said transistor to provide base-to-emitter bias of sufficient amplitude to operate the transistor in the saturation region during the quiescent period of a speed-up network connected to the base of said transistor; said balancing network including equivalent transformer, transistor, speed-up network, battery, and potentiometer, said potentiometer being adapted to adjust the amplitude of the balancing signal for exact cancellation of switching transients.

5. Apparatus for gating the output signals of a photomultiplier comprising:

first, second, and third zener diodes;

means connected to the anode of said photomultiplier to hold the anode at a negative potential sufficient to exceed the zener breakdown voltage of said first diode, but insufficient to exceed the zener breakdown voltage of said second diode;

pulse generator means adapted to apply a negative gate pulse to said first diode and an equal but opposite pulse to said third diode;

said first and second diodes being connected to the anode of said photomultiplier and to said third diode such that said negative gate pulse drives said first diode into the non-conducting region and appears at the anode of said second diode of sufficient amplitude to bring said second diode up to, but not quite into, the avalanche region of reverse breakdown to permit said negative going output signals to break down said second diode;

said positive pulse balancing stray capacity effects of said first and second diodes.

References Cited by the Examiner
UNITED STATES PATENTS

| | | | |
|---|---|---|---|
| 2,810,828 | 10/1957 | Gray et al. | 250—71.5 X |
| 2,862,106 | 11/1958 | Scherbatskoy | 250—71.5 |
| 2,867,728 | 1/1959 | Pollock | 250—83.6 X |
| 2,991,364 | 7/1961 | Goodman | 250—83.6 X |
| 3,030,511 | 4/1962 | Scherbatskoy | 250—71.5 X |
| 3,115,579 | 12/1963 | Hall et al. | 250—71.5 X |

RALPH G. NILSON, *Primary Examiner.*

ARCHIE R. BORCHELT, *Examiner.*